(12) United States Patent
Oh et al.

(10) Patent No.: US 8,025,575 B2
(45) Date of Patent: Sep. 27, 2011

(54) CONSTANT VELOCITY JOINT OF TRIPOD TYPE

(75) Inventors: Seung Tark Oh, Farmington Hills, MI (US); Tae Hong Kim, Farmington Hills, MI (US)

(73) Assignee: Hyundai Wia Corporation (KR)

( * ) Notice: Subject to any disclaimer, the term of this patent is extended or adjusted under 35 U.S.C. 154(b) by 322 days.

(21) Appl. No.: 12/210,143

(22) Filed: Sep. 12, 2008

(65) Prior Publication Data
US 2009/0011843 A1 Jan. 8, 2009

Related U.S. Application Data

(63) Continuation-in-part of application No. 11/750,138, filed on May 17, 2007, now Pat. No. 7,819,752.

(51) Int. Cl.
*F16D 3/205* (2006.01)
(52) U.S. Cl. ........................ 464/111; 464/905
(58) Field of Classification Search .................. 464/111, 464/122–124, 132, 905; 384/571
See application file for complete search history.

(56) References Cited

U.S. PATENT DOCUMENTS

| | | | |
|---|---|---|---|
| 2,670,614 A * | 3/1954 | Wildhaber | ..................... 464/124 |
| 5,203,741 A | 4/1993 | Turner et al. | |
| 5,256,107 A | 10/1993 | Matsumoto et al. | |
| 6,454,655 B1 | 9/2002 | Kudo et al. | |
| 6,533,668 B2 | 3/2003 | Mizukoshi et al. | |
| 6,682,434 B2 | 1/2004 | Kawakatsu et al. | |
| 6,699,134 B2 | 3/2004 | Sams et al. | |
| 6,726,570 B2 | 4/2004 | Sugiyama et al. | |
| 6,764,406 B2 * | 7/2004 | Mizukoshi et al. | ........... 464/111 |

(Continued)

FOREIGN PATENT DOCUMENTS

JP S62-233522 A 10/1987

(Continued)

*Primary Examiner* — Greg Binda
(74) *Attorney, Agent, or Firm* — Park & Associates IP Law, P.C.

(57) ABSTRACT

A constant velocity joint for a drive system of a vehicle comprises: a spider trunnion for transmitting torque between first and second shaft of the drive system, the spider trunnion including a spherical outer surface; and a roller assembly operatively attached on the spider trunnion, the roller assembly including an inner roller, an outer roller, and a plurality of needle rollers engaged between the inner and outer rollers, wherein the inner roller includes a tapered outer surface with a taper angle ($\theta t$), and the outer roller includes a tapered inner surface with the same taper angle ($\theta t$). The taper angle ($\theta t$) is preferably in a range from about 0.23° and to about 1.17°, and selected in consideration of both accommodating the inner roller to move without jamming in an entire effective movement range under presence of a maximum joint angle of the drive system, and preventing self separation of the roller assembly by jamming stop between the inner, outer and needle rollers due to the tapered structure of the rollers. The inner roller is preferably configured to have a ratio LL/RR1 in a range from about 0.11 to about 0.20, where LL is a distance from the center of the spider trunnion to a starting edge of the chamfer or recessed area of the inner roller at initial or neutral position thereof, and RR1 is a radius of the spherical surface of the spider trunnion.

10 Claims, 12 Drawing Sheets

U.S. PATENT DOCUMENTS

| | | |
|---|---|---|
| 6,776,719 B2 | 8/2004 | Perrow |
| 7,083,522 B2 | 8/2006 | Bongartz |
| 7,121,950 B2 | 10/2006 | Izumino et al. |
| 7,819,752 B2 | 10/2010 | Oh |
| 2006/0030413 A1 | 2/2006 | Izumino et al. |
| 2006/0217205 A1 | 9/2006 | Izumino et al. |
| 2007/0066405 A1 | 3/2007 | Ando et al. |
| 2007/0093302 A1 | 4/2007 | Perrow et al. |

FOREIGN PATENT DOCUMENTS

| | | |
|---|---|---|
| KR | 10-2004-0071382 A | 8/2004 |
| WO | 90/07067 A1 | 6/1990 |

* cited by examiner

CONSTANT VELOCITY JOINT OF TRIPOD TYPE

REFERENCE TO RELATED APPLICATION

The present application is a continuation-in-part of U.S. patent application Ser. No. 11/750,138, entitled "CONSTANT VELOCITY JOINT OF TRIPOD TYPE" and filed on May 17, 2007 (now U.S. Pat. No. 7,819,752), which was filed by the applicant (namely, an inventor of this application) and assigned to the same assignee as the present application, the content of which is incorporated herein by reference in its entirety.

FIELD OF THE INVENTION

The present invention relates to a constant velocity joint of tripod type, which is disposed between a drive shaft and a driven shaft coupled to each other and typically used in a drive axle of, for example, an automobile for transmitting rotational torque between the rotating shafts.

BACKGROUND OF THE INVENTION

Tripod type constant velocity joints are well known in the automobile industry as one type of constant velocity joints used in the drive system of vehicles for transferring a uniform torque and a constant speed, while operating with a wide range of joint angle.

For instance, one example of the tripod type constant velocity joint was illustrated in Japanese Patent Application, S62-233522. This tripod type constant velocity joint typically includes tripod fixed to an end of the second rotating shaft, which functions as a driven member, and hollow cylindrical housing fixed to an end of the first rotating shaft which functions as a drive member. Three circumferential grooves are formed at three locations on the inner face of the housing at equal spacing in the circumferential direction and extend in the shaft direction of the housing. Each tripod comprises a boss connected to the second rotating shaft, and each trunnion has a cylindrical shape and extends radially from three locations at equal spacing around the boss. Each trunnion has a roller fixed at a distal end of the trunnion and with needle rollers engaged therein. In this arrangement, each roller can freely rotate about the trunnion while also be displaced in the axial direction of the trunnion. The constant velocity movement between the first and second rotating shafts is ensured with the rollers rotatably and displaceably engaging in the grooves disposed along the inner face of the housing. In order to facilitate the sliding movement, a pair of side faces are formed in circular recesses on each side of the respective grooves, and each roller is supported rotatably and pivotally along the side faces of the grooves.

When the first and second rotating shafts rotate with a joint angle present between the first and second shafts, each roller moves with complexity. For example, each roller moves in the axial direction of the housing along each of the side faces of the respective guide grooves, while the rollers change in orientation and further displace in the axial direction of the trunnion. Such movement of the rollers cannot cause a relative movement between a peripheral outside face of each of the rollers and each of the side faces to be smoothly made. Thus, a relatively large friction occurs between the faces. As a result, this tripod type constant velocity joint produces three-directional axial forces as the shafts rotate. In the application of a prior art tripod joint to the vehicles, it is known that the axial forces may cause a transverse vibration typically referred to as "shudder". This shudder disturbance may become severe particularly when a large torque is transmitted with a relatively large joint angle present.

Moreover, various suggestions and attempts were made to improve the functions or operability of the constant velocity joint. For example, FIG. 1 illustrates one known structure of a tripod type constant velocity joint, in which a spider (or trunnion) 11 is operably received in housing 12 with a roller assembly assembled to the spider 11 for transmitting torque between first and second rotating shafts. The roller assembly received in a guide groove of the housing 12 is composed essentially of outer roller 13', inner roller 14', and multiple needle rollers 15 engaged between the outer and inner rollers 13' and 14'. In this example, the inner roller 14' has a cylindrical surface on the outer diameter thereof, and the outer roller 13' has a cylindrical surface on its corresponding inner diameter thereof, in which the cylindrical surfaces do not include any taper angle present to accommodate needle rollers 15 between the opposing cylindrical surfaces of the inner and outer rollers 14' and 13'. In this structure, clearance $\delta 1$ is present between the outer surface of the inner roller 14' and the needle rollers 15 (or between the inner surface of the outer roller 13' and the needle rollers 15), which is constant throughout the length due to the opposing and parallel cylindrical surface configurations of the roller assembly regardless of the axial movement or position of the inner roller 14' in the roller assembly. As shown in FIG. 1, the outer roller 13' includes an inwardly-projecting portion "AA" in order to prevent the outer roller 13' (or the inner roller 14') from separating from the inner roller 14' (or the outer roller 13') of the roller assembly.

SUMMARY OF THE INVENTION

Accordingly, the present invention provides a novel and improved construction to the constant velocity joint of tripod type which has a sufficient durability and can also effectively reduce the conventional shudder or frictional contact problems and other drawbacks associated in the conventional constant velocity joint.

As will be described in details below, the constant velocity joint of the present invention provides a tapered roller structure in the inner and outer rollers thereof. Moreover, according to the present invention, the outer roller 13 is effectively prevented from self-separation from the roller assembly, although the outer roller 13 does not include the projecting portion "AA" as in the conventional joint described above. Furthermore, the inner roller of the constant velocity joint of the present invention provides an optimal configuration and dimension which can provide a sufficient durability and mechanical strength to the roller assembly, while also considering the assembling and disassembling performance of the constant velocity joint without undue difficulties.

In order to restrain the conventional shudder problems and also to enhance other structural and functional features of the constant velocity joint, the applicant of this application has discovered and introduced various suggestions. Among such suggestions, Applicant's copending patent application Ser. No. 11/750,138, filed on May 17, 2007 (now U.S. Pat. No. 7,819,752), over which the present application claims priority, discloses a novel and useful constant velocity joint apparatus and methods of assembling the joint, in which the joint includes, among others, a roller assembly (or roller kit) composed of an inner roller 4 with a tapered or conical outer face 4a (with taper angle $\theta$ defined by the conical face 4a), an outer roller 3 with a tapered or conical inner face 3a (with the same taper angle $\theta$ defined by the conical face 3a). See FIGS. 2 and 3 (which are equivalent to FIGS. 5(a) and 11 in the identified application Ser. No. 11/750,138).

As illustrated in FIGS. 2 and 3 and is also specifically discussed in application Ser. No. 11/750,138, owing to the tapered structures of the roller kit, the transmitting torque is transferred through the contact made between the tapered outer face 4a of the inner roller 4 and needle rollers 5 and between the needle rollers 5 and the tapered inner face 3a of the outer roller 3. This causes the roller assembly 12 to be biased toward the inner portion 2d (i.e., toward the boss 11 of the trunnion 6) of the groove guides 10 of the housing 2, by an axial component Fv of a load which is acting in the direction of the axis of the trunnion and toward the boss of the trunnion. Accordingly, this tapered configuration facilitates the roller assembly 12 to rotate smoothly with slight bias toward the boss of the tripod while reducing the frictional contacts between the lateral (outer) side of the outer roller 3 and the lateral tracking guide 2c of the housing 2.

Due to the tapered structures in the roller assembly, the inward movement of the inner roller 4 (or outer roller 3) toward the boss of the trunnion 6 causes the clearance Δ between the outer roller 3 and inner roller 4 to be decreased gradually. As a result, the inward movement of the inner roller 4 (or outer roller 3) is limited to a predetermined amount by the contact or jamming of the inner roller 4 against the needle rollers 5 and outer roller 3 due to the tapered structure of the roller assembly. Accordingly, this tapered roller configuration helps the inner roller 4 or outer roller 3 to limit its axial movement within a permissible range, thus preventing the roller from separating or self-disassembling from the roller assembly.

As such, the present applicant has discovered that the provision of tapered roller structures in the constant velocity joint produces substantial advantages and benefits, for example, such as reduction of adverse frictional contacts and prevention of self separation of the roller assembly as discussed above.

Moreover, as detailed below, the present applicant has further discovered that, with the tapered roller structure, selection of an optimal taper angle of the roller assembly is very significant for the proper functioning and smooth operation of the constant velocity joint while also providing a required mechanical strength. In addition, the proper selection of an optimal taper angle of the roller assembly is also very important in order to allow the inner roller to move smoothly in axial direction in an entire movement range thereof, while also enabling the inner roller to stop by jamming at the end of the movement limit due to the tapered structure, and thereby to prevent the roller assembly from loosening or self-disassembling during the operation or in the maintenance or assembling processes. In order to determine an appropriate taper angle for accommodating the inner roller to move in the entire movement range without jamming in the opposing rollers while also preventing the self separation of the outer roller (or inner roller) by jamming at the end of the movement limit, the total effective movement distance of the inner roller under the maximum joint angle condition and a change of clearance caused by this movement should be considered. In this disclosure as will be disclosed below, a range of permissible taper angle per PCD (pitch circle diameter) of spider and an effective taper length of the rollers will be defined, preferably based on or in relation with the maximum joint angle, the clearance in the rollers, and the roller length, which are applicable to the typical tripod joint with straight rollers.

The present applicant has also discovered that selection of an optimal configuration and optimal size of the inner roller is also very significant to provide a required mechanical strength, while also contemplating the assembling and disassembling performance of the joint. In order for the tapered roller structure of the invention to provide the same or enhanced durability or strength as with the conventional tripod joint with straight rollers, while also enabling the assembling and disassembling process of the roller assembly with the spider trunnion to be performed without difficulties, the inner roller is configured to have an optimal length LL (the distance from the center C3 of the spider trunnion to the lower edge P of the inner concave contact surface of the inner roller) which can cover the entire elliptical contact area of the roller assembly that is displaced inwardly due to the tapered roller structure. As will be disclosed below in details, the length LL per the taper angle and the spider trunnion radius will be defined, preferably based on the range of taper angle, the range of typical spider trunnion radius, PCD of spider, and the acceptable overlap in the rollers for suitably assembling and disassembling the rollers.

According to one preferred embodiment of the present invention, a constant velocity joint for a drive system of a vehicle comprises:

a spider trunnion for transmitting torque between first and second shaft of the drive system, the spider trunnion including a spherical outer surface; and, a roller assembly operatively attached on the spider trunnion, the roller assembly including an inner roller, an outer roller, and a plurality of needle rollers engaged between the inner and outer rollers, in which the inner roller includes a tapered outer surface with a taper angle ($\theta t$), and the outer roller includes a tapered inner surface with the same taper angle ($\theta t$).

According to one preferred embodiment of the present invention, the taper angle ($\theta t$) is selected in consideration of accommodating the inner roller to move without jamming in an entire effective movement range under presence of a maximum joint angle of the drive system, and also in further consideration of preventing self separation of the roller assembly by jamming stop between the inner, outer and needle rollers due to the tapered structure of the rollers. The taper angle ($\theta t$) is preferably in a range defined by the equation of: $2\tan^{-1}(0.030/Lt) < \theta t < 2\tan^{-1}(0.3556/P1)$, in which Lt is a length from an upper end surface of the inner roller to a lower end of the needle rollers, and P1 is a pitch circle diameter of the spider trunnion. For typical vehicle applications, the taper angle ($\theta t$) is preferably in a range from about $0.23°$ and to about $1.17°$.

According to another preferred embodiment of the present invention, the inner roll is configured to have a dimension LL (that is, a distance from the center of the spider trunnion to a starting edge of the chamfer or recessed area of the inner roller, when the inner roller is at initial or neutral position) to cover the entire elliptical contact area which is displaced downward (inward toward the boss of trunnion) due to presence of the taper angle ($\theta t$) and also in further consideration of an assembling and disassembling performance of the inner roller to the spider trunnion. In this manner, the inner roller is configured to have a ratio LL/RR1 in a range from about 0.11 to about 0.20 for typical vehicle applications, in which RR1 is a surface radius of the spherical outer surface of the trunnion.

According to another preferred embodiment of the present invention, a method of assembling or disassembling a constant velocity joint comprises:

providing a spider trunnion, the spider trunnion having a spherical outer surface with a radius (RR1);

providing a roller assembly, the roller assembly having an inner roller, an outer roller, and a plurality of needle rollers, the inner roller having a tapered outer surface with a taper angle, and the outer roller having a tapered inner surface with a taper angle same as the taper angle of the inner roller;

wherein the inner roller includes a concave inner contact surface with a radius (RR2), the inner roller further has a chamfer or recessed area starting from a lower edge of the concave inner contact surface, and the inner roller has a dimension LL from the center of the spider trunnion to the starting edge of the chamfer or recessed area, and the inner roller is configured to have a ratio LL/RR1 in a range from about 0.11 to about 0.20;

tilting the inner roller to a degree;

placing one lower side of the inner roller onto the spherical surface of the spider trunnion; and pushing and introducing an opposite lower side of the inner roller by hand or with the aid of an assembling tool through a top side of the spherical surface of the spider trunnion.

According to another preferred embodiment of the present invention, the method of assembling or disassembling a constant velocity joint further comprises: disassembling the inner roller from the spider trunnion by applying an upward load onto a lower side of the inner roller while without applying a substantial force onto the needle rollers and the outer roller.

BRIEF DESCRIPTION OF THE DRAWINGS

The above described and other objects, features and advantages of the present invention will be more apparent from the presently preferred embodiments of the invention disclosed in the following description and illustrated in the accompanying drawings, in which.

DETAILED DESCRIPTION OF THE INVENTION

Figure 1:
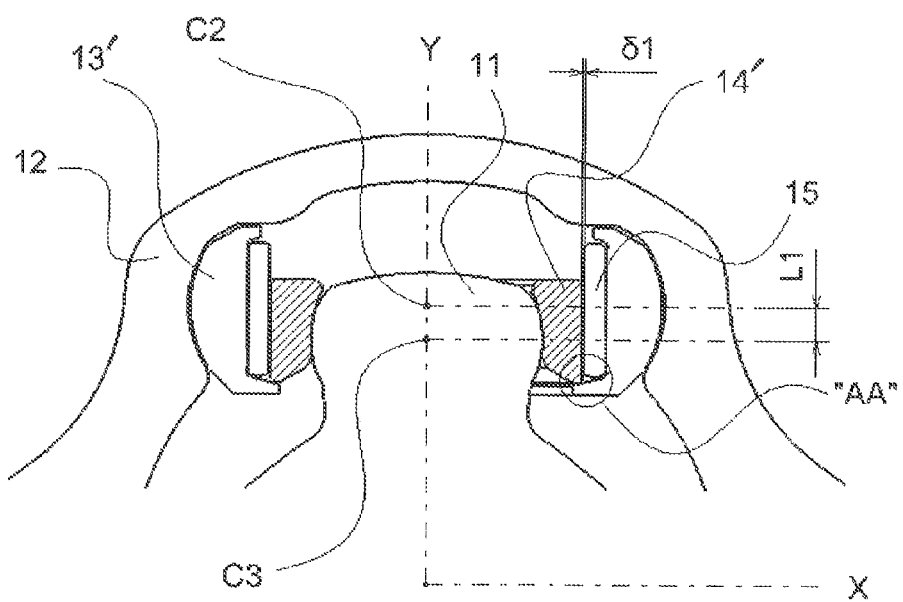
FIG. 1 is a partial cross-sectional view illustrating an exemplary structure of a conventional tripod type constant velocity joint.

Referring to the drawings, the tripod type constant velocity joints of the present invention are described herein in further details with several exemplary or preferred embodiments thereof. However, the following descriptions of such embodiments are intended primarily for illustrating the principles and exemplary constructions of the constant velocity joints of the present invention, and the present invention is not specifically limited to these exemplary embodiments. Thus, one skilled in the art can appreciate or recognize that various modifications and substitutions can be made thereto without departing from the spirit and scope of the present invention.

The present invention is associated with and claims priority over Applicant's previous application Ser. No. 11/750,138. Accordingly, the entire contents of this application are incorporated herein by reference, and the detailed descriptions of the constant velocity joints of this application are not repeated herein for simplicity purposes.

Figure 5A:
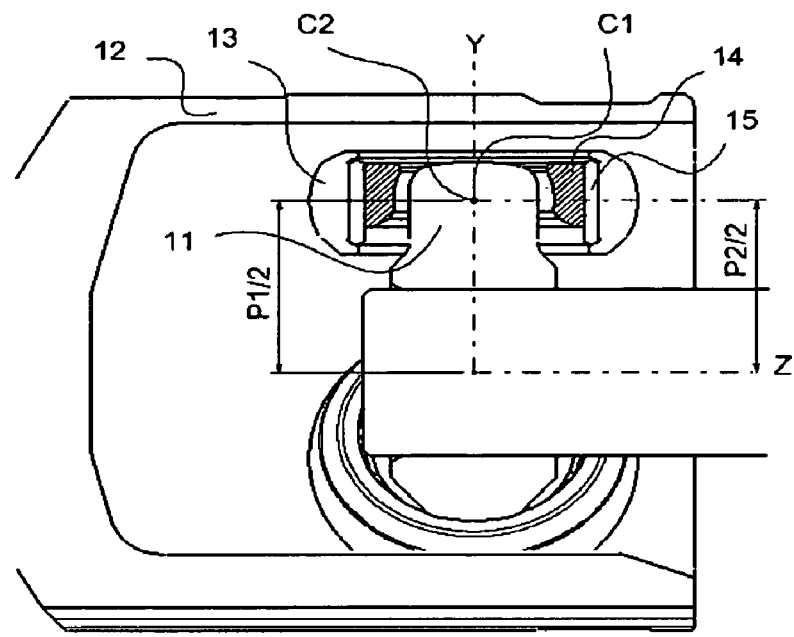
FIGS. 5(a) and 5(b) are partial cross-sectional views of a tripod type constant velocity joint, illustrating a general construction and operation of the joint according to the present invention.
Figure 5B:
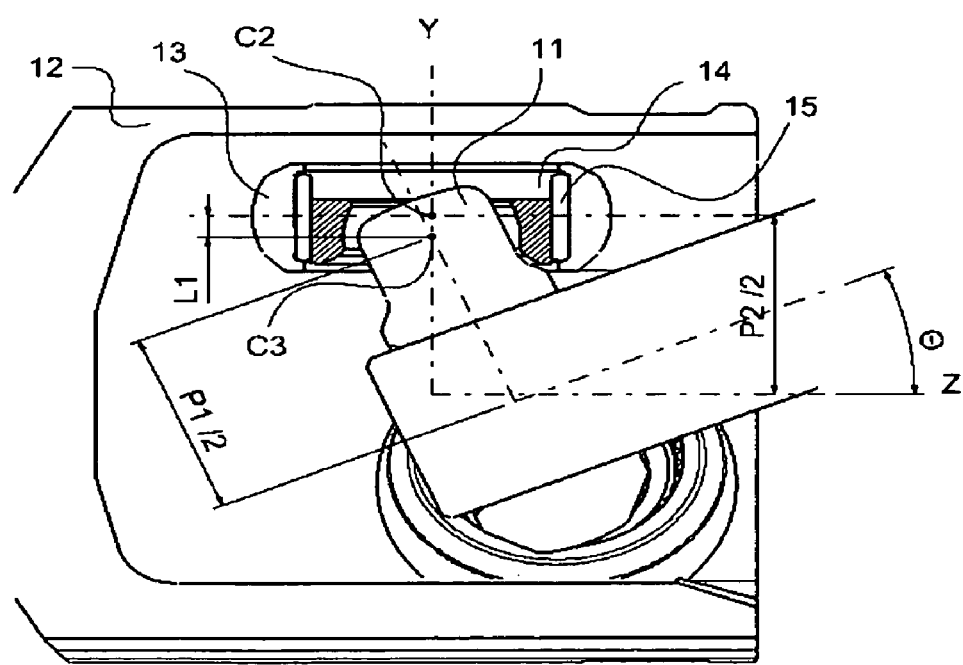

With reference to FIGS. 5(a) and 5(b), a general construction and operation of the constant velocity joint of the present invention is described herein, in which the joint is shown only in part for simplicity. The constant velocity joint of this embodiment includes a roller assembly or roller kit, which is rollably engaged on the spider trunnion 11 to transmit a rotation torque from the housing of a first (driving) shaft to a second (driven) shaft via the spider trunnion 11. The roller assembly includes an inner roller 14, an outer roller 13, and needle rollers 15 between the inner and outer rollers 14 and 13. The outer roller 13 is rollably guided in the guide groove of the housing 12 extending in the axial direction (i.e., Z direction) of the housing 12, and the inner roller 14 moves in the lateral direction (i.e., Y direction) within the roller assembly in association with the tilting movement of the spider trunnion 11 of the driven shaft.

As shown in FIG. 5(b), with a maximum joint angle θ present (which is determined by the design specifications of the particular vehicle), the spider trunnion 11 is also tilted by the same angle θ. This causes the center C3 (namely, the center of the spherical outer surface) of the spider trunnion 11 and also the inner roller 14 to move inwardly (i.e., toward the boss of the trunnion) by an offset distance L1. Here, the offset L1 can be defined as the distance between the displaced center C3 of the spider 11 (P1/2) and the center C2 of the guide groove (P2/2) of the housing 12 as the spider center moves from a neutral point C1 (FIG. 5(a)) to a point C3 (FIG. 5(b)). It is noted that the center C2 remains at the same lateral position in Y direction regardless of the tilting movement of the spider trunnion 11. The inner roller 13 should be designed to move freely and without substantial frictions or jamming present between C2 (neutral position) and C3 with offset L1 as the shaft and spider tilts to a maximum joint angle θ. In most conventional vehicles, the maximum joint angle θ is typically in the range between 20 degree and 25 degree.

Figure 2:
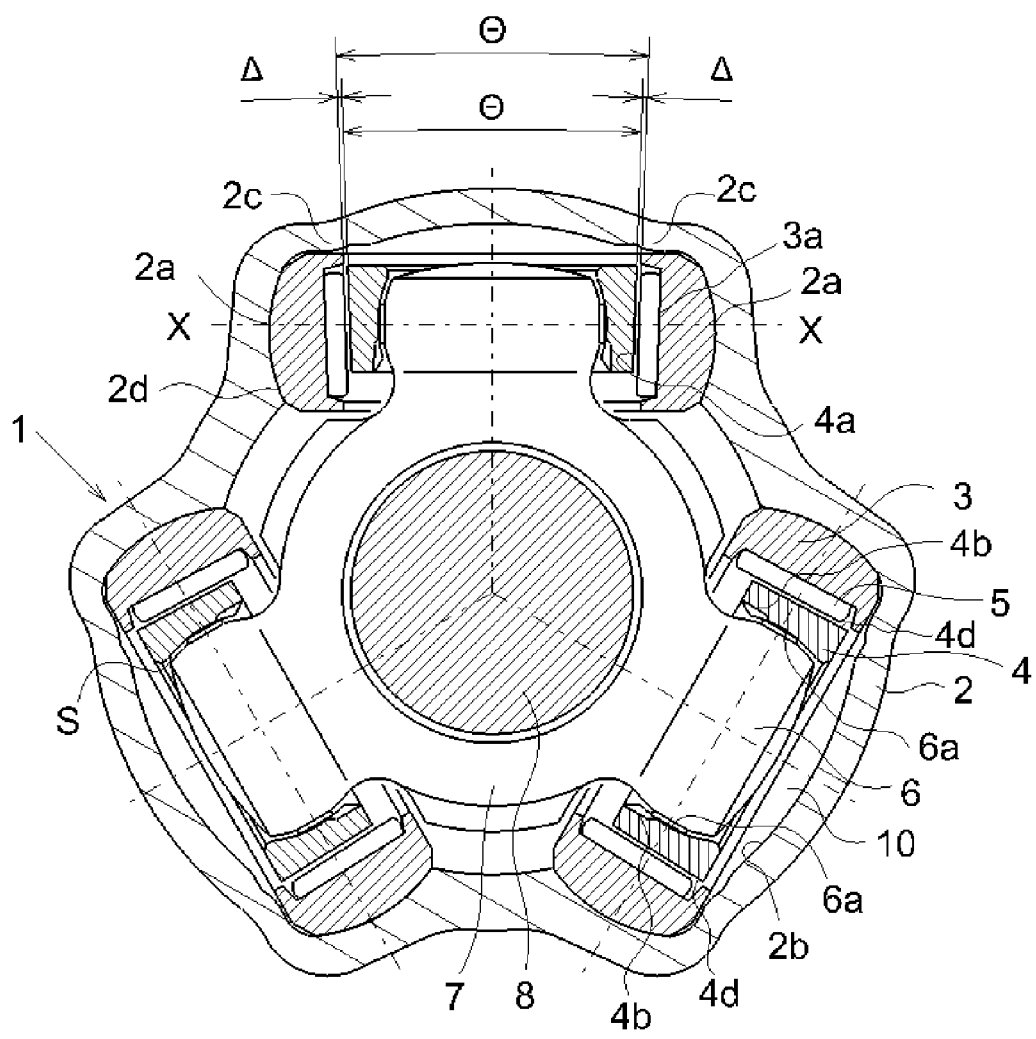
FIG. 2 is a cross-sectional view of a tripod type constant velocity joint according to one preferred embodiment of the present invention (which was also disclosed in Applicant's copending patent application Ser. No. 11/750,138, and over which the present application claims priority)
Figure 3:
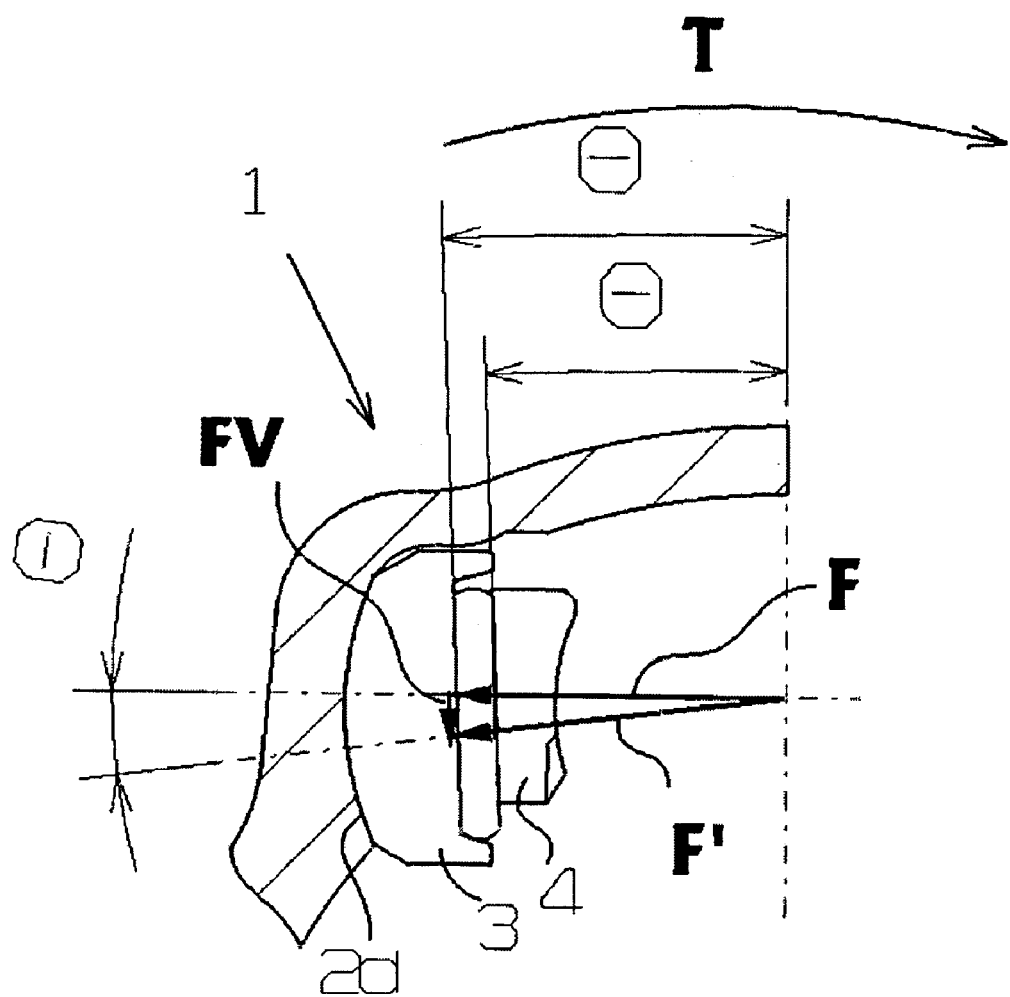
FIG. 3 is an explanatory and partial cross-sectional view showing a load force and bias acting on the roller assembly as shown in FIG. 2.
Figure 4:
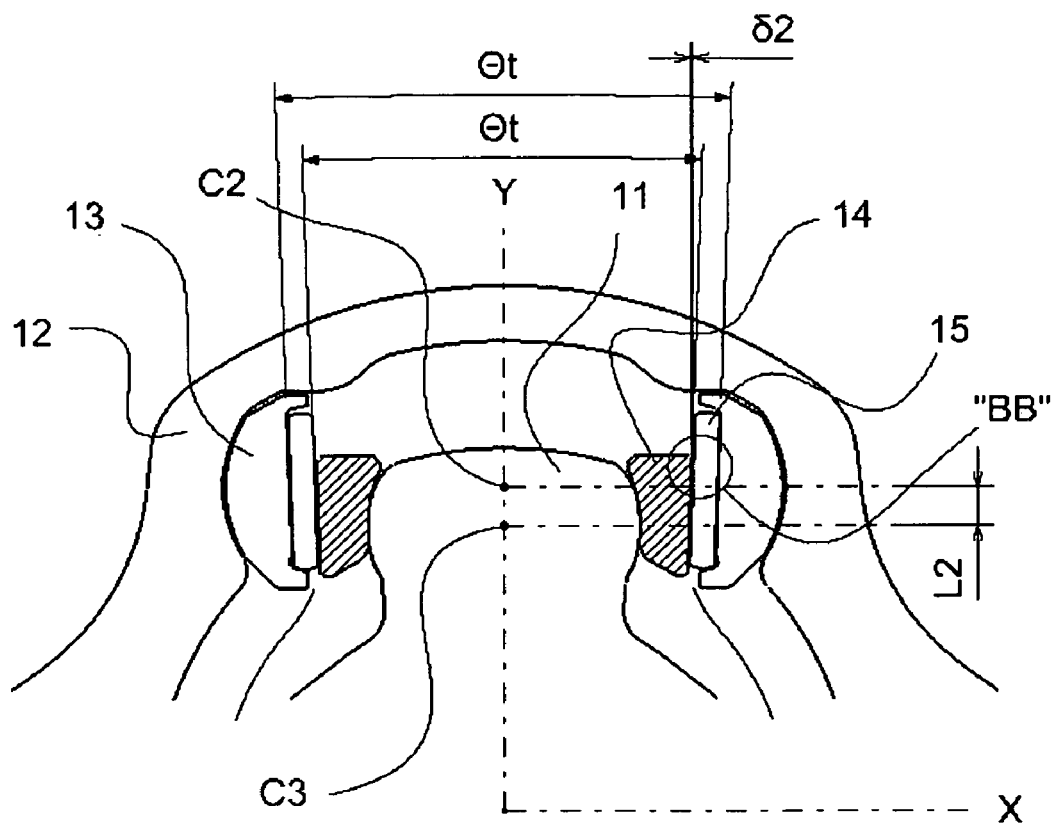
FIG. 4 is a partial cross-sectional view of a tripod type constant velocity joint, constructed according to one preferred embodiment of the present invention.

With reference now to FIG. 4, one preferred embodiment of the present invention is described herein. As shown, the constant velocity joint of this embodiment includes a roller assembly (which is typically referred as a roller kit), in which the roller assembly includes inner roller 14 having a tapered or conical outer surface with taper angle θt, outer roller 13 with a corresponding tapered inner surface of the same taper angle θt, and needle rollers 15 disposed between the inner and outer rollers 14 and 13. As discussed above in connection with FIGS. 2 and 3, due to this tapered structure of the roller assembly, the axial and inward movement of the inner roller 14 (or outer roller 13) within the roller assembly is limited to a predetermined degree and to be jammed or stopped at the end of the limit due to the tapered roller structure. Consequently, the self-separation of the inner roller (or outer roller) from the roller assembly is effectively prevented although the outer roller 13 does not include a conventional locking structure (for example, such as the projected portion "AA" as shown in FIG. 1) which was typically adopted for preventing the self separation of the inner or outer roller from the roller assembly.

Discussing more specifically with reference to FIG. 4, clearance δ2 between the inner roller 14 and outer roller 13 is varied depending upon the offset L1 and the taper angle θt. As a result, self separation of the outer roller 13 or inner roller 14 from the assembly is prevented by the jamming in the rollers 13, 14 and 15 at the area "BB" where δ2 equals zero. Applicant discovered that the selection of an appropriate taper angle θt is highly important for proper functioning of the constant velocity joint. If the taper angle θt is too small, the effective displacement length L2 (which is the total moving distance of the inner roller 14 from its initial (neutral) position to the position where δ2 becomes zero) is increased. However, this can cause the outer roller 13 to be improperly separated or disassembled from the assembled state. To the contrary, if the taper angle θt is too big, it has the advantage to retain the outer roller in the properly assembled state without self separation or loosening out. However, the jamming stopping of the rollers occurs prematurely even in the range where L2 is less than the total effective moving distance L1 of the vehicle with the maximum joint angle θ present, thus deteriorating the proper operation of the roller assembly in the predetermined range of operation of the vehicle as designed. Therefore, a proper selection of the taper angle θt is essential for the proper accommodation of the inner roller in its total effective moving range L1 with the predetermined maximum joint angle θ of the vehicle, in particular, when the constant velocity joint includes a tapered roller structure as in the present invention. Moreover, the proper selection of the taper angle θt is also critical to prevent the outer roller 13 (or inner roller 14) from inadequately separated or loosened out from its assembled state.

Figure 6A:
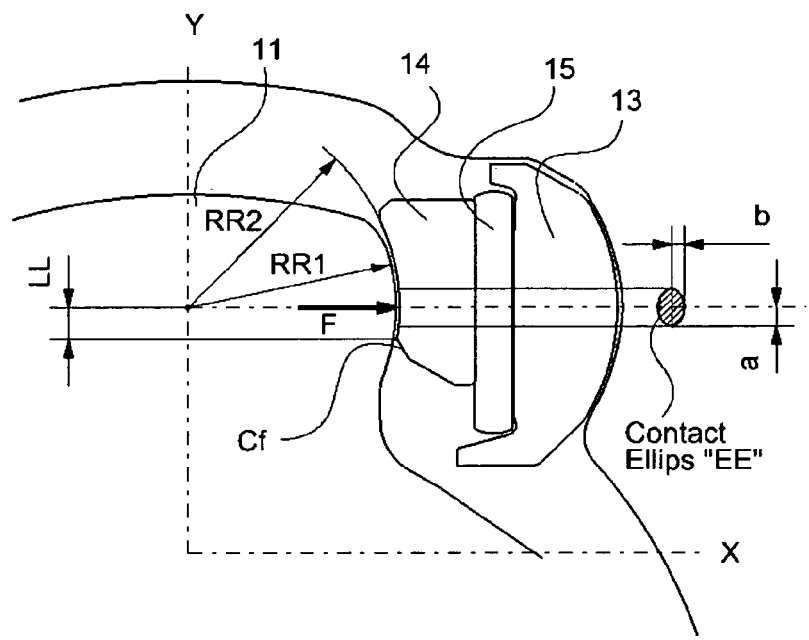
FIG. 6(a) is a partial cross-sectional view of a tripod type constant velocity joint according to one preferred embodiment of the present invention.
Figure 6B:
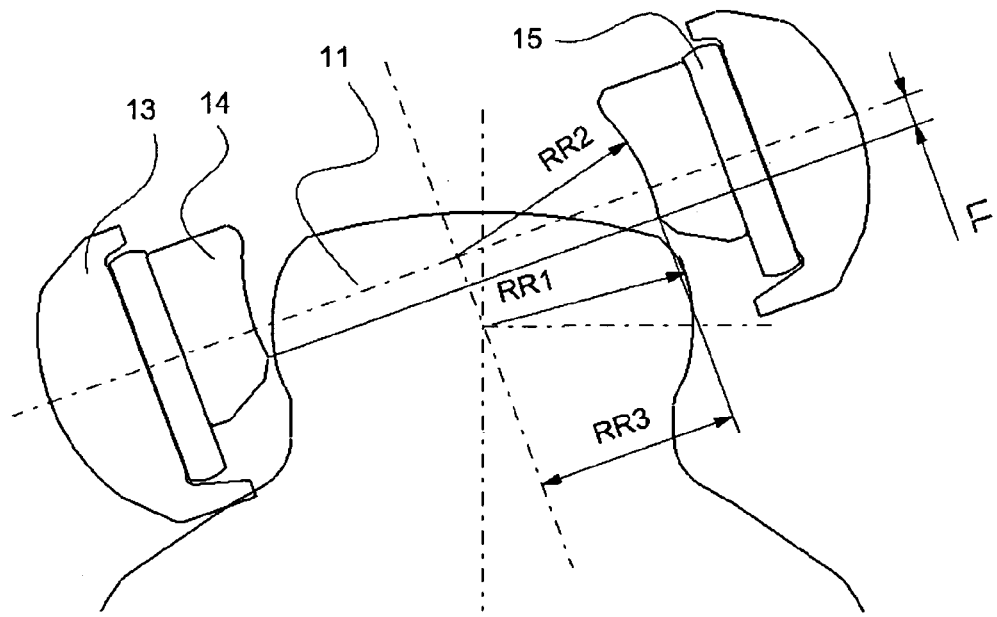
FIG. 6(b) is a partial cross-sectional view similar to FIG. 6(a), illustrating a principle of the present invention in terms of the assembling considerations.

FIG. 6(a) shows a constant velocity joint, in which its inner and outer rollers have cylindrical opposing surfaces without having any taper angle in the cylindrical surfaces thereof. The inner radius RR2 of the inner roller 14 is similar to, but is slightly larger than the outer radius RR1 of spider trunnion 11, and the inner roller 14 preferably includes a chamfer or recess area "Cf" at the lower (inward) region thereof with its inner diameter enlarged from the inner contact edge of the inner roller 14. This chamfer or recess area "Cf" facilitates the assembling and disassembling process to be discussed later in details. The present applicant discovered that the distance LL from the center C3 of the spider trunnion 11 to the starting edge of the chamfer "Cf" of the inner roller 14 has a significant effect not only on the mechanical strength and durability of the assembly, but also on the characteristics of assembling and disassembling of the roller assembly to and from the spider trunnion 11. According to the Hertzian contact theory, under a load F applied, an elliptical contact area EE is provided between the convex surface of the spider trunnion 11 and the convex surface of the inner roller 14, in which the contact ellipse has major radius "a" and minor radius "b" as illustrated. Therefore, if the distance LL becomes longer, the mechanical strength or durability of the joint is enhanced due to the enlarged margin from the end of major diameter "a" of the elliptical contact area EE to the chamfer edge of the inner roller 14. However, as illustrated in FIG. 6(b), it has a disadvantage for the assembling and disassembling is concerned because, as the margin increases, the projected inner radius RR3 on the chamfer edge of the inner roller 14 is reduced proportionally. Such reduction of the projected inner radius RR3 of the inner roller 14, by the extended length LL of the inner roller, causes an increased interference with the spherical surface of spider trunnion 11 as the inner roller 14 is tilted to a predetermined angle for assembling to the spider 11 trunnion.

Figure 6C:
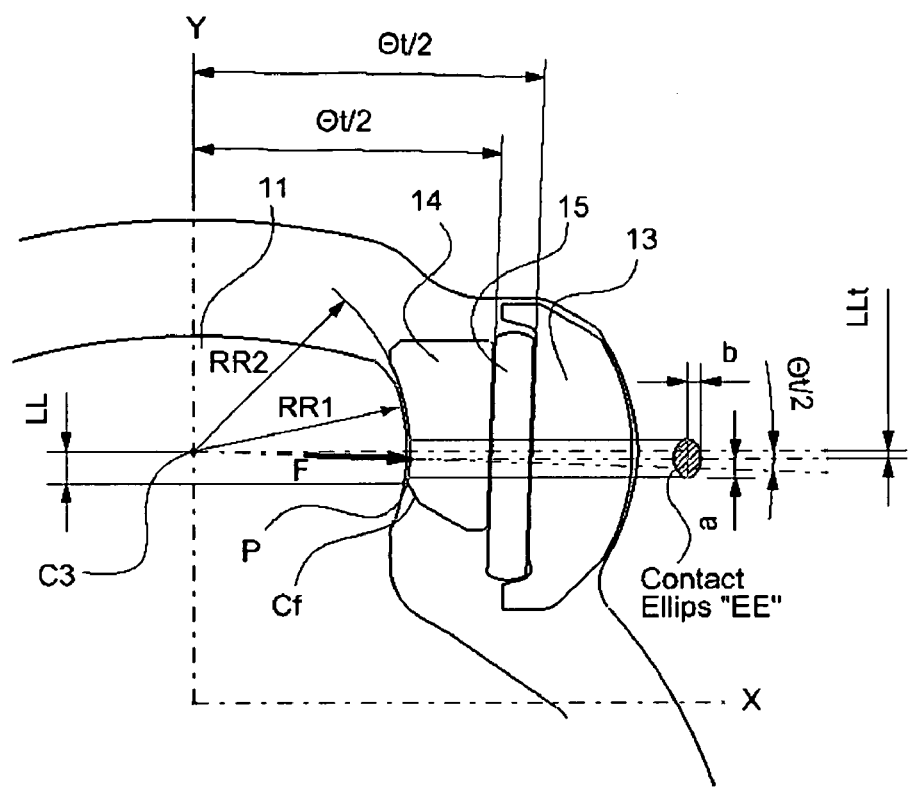
FIG. 6(c) is a partial cross-sectional view of a tripod type constant velocity joint according to another preferred embodiment of the present invention, in which the roller assembly has a tapered roller structure.

FIG. 6(c) illustrates one embodiment of the present invention where the outer and inner rollers 13 and 14 each include a taper angle Et. With the taper present in the rollers, the load F applies onto the surface with a tilting angle by one half of the taper angle θt, and as a consequence, the center of the elliptical contact area EE moves downward by "LLt" when compared to the straight roller structure of FIG. 6(a). Accordingly, the distance LL (from the center C3 of the spider trunnion 11 to the starting edge "P" of the chamfer "Cf" of the inner roller 14) should be extended longer in order to provide the tapered inner roller 14 with the same degree of mechanical strength or durability as the straight roller structure of FIG. 6(a). Therefore, the selection of the distance LL for the tapered roller structure is more critical in order to make the roller assembly to endure with sufficient strength while also enabling the assembling and disassembling process to be performed without undue difficulties.

Figure 7A:
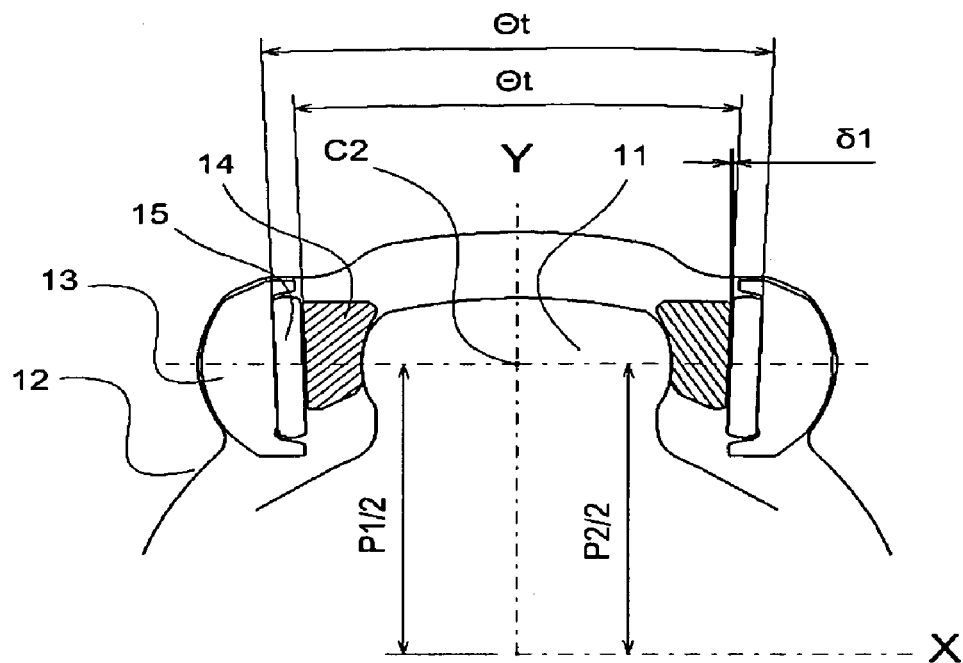
FIGS. 7(a), 7(b) and 7(c) are partial cross-sectional views of the tripod type constant velocity joint of FIG. 6(c), for further illustrating its operation and selection of an appropriate taper angle of the roller structure.
Figure 7B:
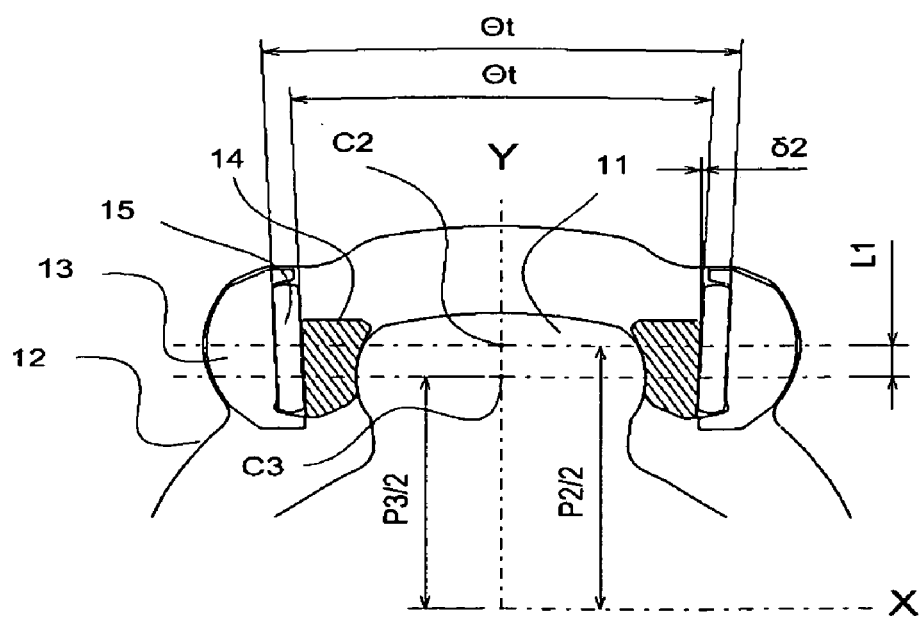
Figure 7C:
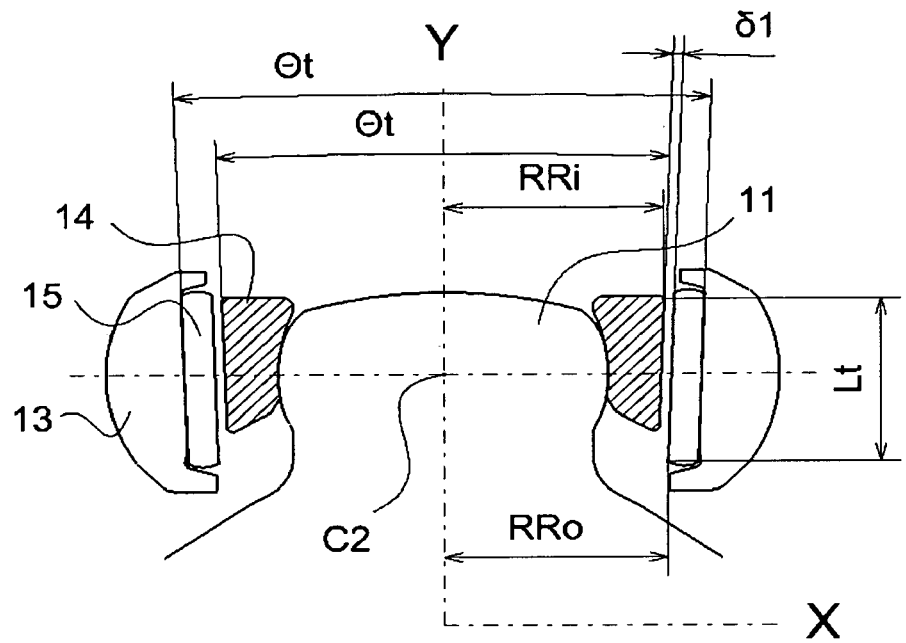

With reference to FIGS. 7(a)-7(c), selection of an appropriate taper angle θt for the tapered tripod joint of the present invention is described with further details. As disclosed, the appropriate taper angle θt is selected with the considerations not only of the accommodation of the inner roller in the roller assembly in the entire effective movement range L1 when it is subject to the maximum joint angle θ, but also of preventing the self separation of the outer roller (or inner roller) from the roller assembly.

Referring first to FIGS. 7(a) and 7(b), the permissible range of taper angle θt for accommodating the maximum joint angle θ without jamming is determined in relation to the total effective movement L1 of the inner roller 14. Here, the length L1 can be defined as $L1=3/4\{P1(1-\cos\theta)\}$, where P1 is the pitch circle diameter of spider trunnion 11. Because the maximum joint angle θ is about 25 degree for most vehicles, this equation can be simplified as $L1=0.0703\,P1$. In addition, considering that the permissible clearance δ1 in the straight roller structure is 0.005 mm to 0.0030 mm, Δt which is defined as the difference between the initial clearance δ1 and the clearance δ2 after movement of L1 should be less than 0.025 mm (namely, 0.030 mm–0.005 mm) in the tapered roller structure.

Referring to FIG. 7(c), the difference Δt can be represented as $\Delta t=L1\tan(\theta t/2)$. By the unification with above equation and the minimum Δt=0.025 mm, the permissible taper angle is defined as $\theta t=2\tan^{-1}\{0.025/(0.0703\,P1)\}=2\tan^{-1}(0.3556/P1)$. Considering that the range of pitch circle diameter P1 is about 35 mm to 75 mm for the typical constant velocity joint, the range of permissible taper angle Et should be from about 0.58 degree to about 1.17 degree.

On the other hand, with reference to FIG. 7(c), the range of permissible taper angle θt to prevent the separation of outer roller 13 depends on the effective roller range Lt which is defined as the length from the upper end of inner roller 14 to the lower end in the guide groove of outer roller 13. The separation of outer roller 13 can be occurred when the inner radius RRo of needle roller 15 exceeds the outer radius RRi, and thus, the minimum taper angle θt is defined as θt=2 tan$^{-1}$(θ2/Lt). In consideration of the permissible maximum clearance δ2 (about 0.030 mm), minimum taper angle θt is converted as θt=2 tan$^{-1}$(0.030/Lt). Considering the distance Lt to be about 8 mm to about 15 mm for typical constant velocity joints, the range of the permissible taper angle θt should be within about 0.23 degree to 0.43 degree.

Therefore, as specified above, the tapered roller structure should have the permissible range of taper angle to be defined by the equation of: 2 tan$^{-1}$(0.030/Lt)<θt<2 tan$^{-1}$(0.3556/P1), in order to not only accommodate the total effective movement range of the inner roller under the maximum joint angle condition but also prevent the separation of the outer roller (or inner roller) from the assembly.

Figure 8:
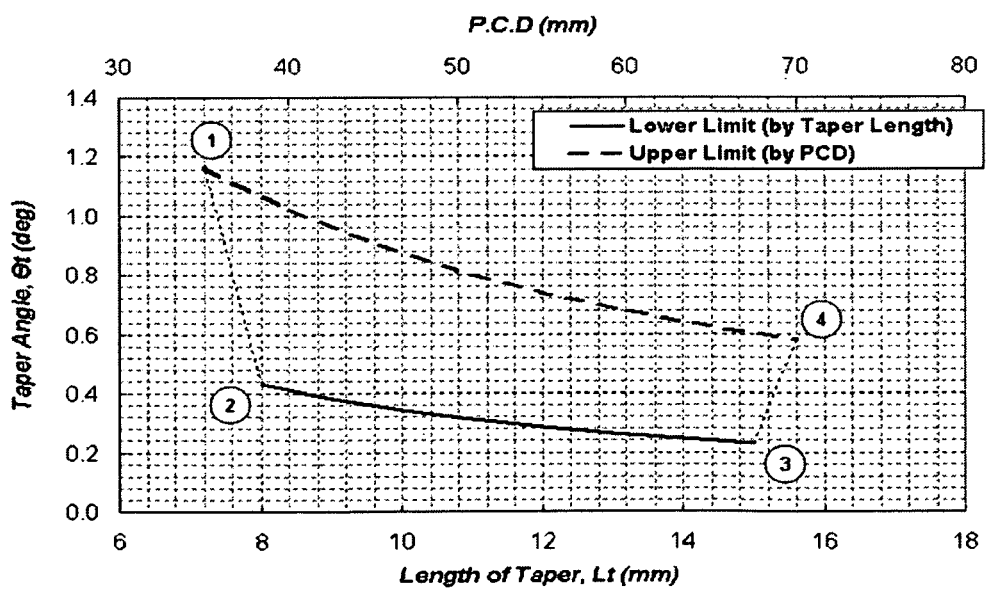
FIG. 8 is a graphic chart illustrating a permissible range of taper angle for the tapered roller structure of the present invention.

Referring to FIG. 8, the graph illustrates the range of permissible taper angle θ per the spider PCD P1 and taper length Lt. This graph indicates that the range of permissible taper angle θt is about 0.23 degree to about 1.17 degree (within the inside range of ①-②-③-④ in the graph), considering the spider PCD P1 (about 35 mm to 75 mm) and taper length Lt (about 8 mm to 15 mm) of the typical constant velocity joints.

Figure 9A:
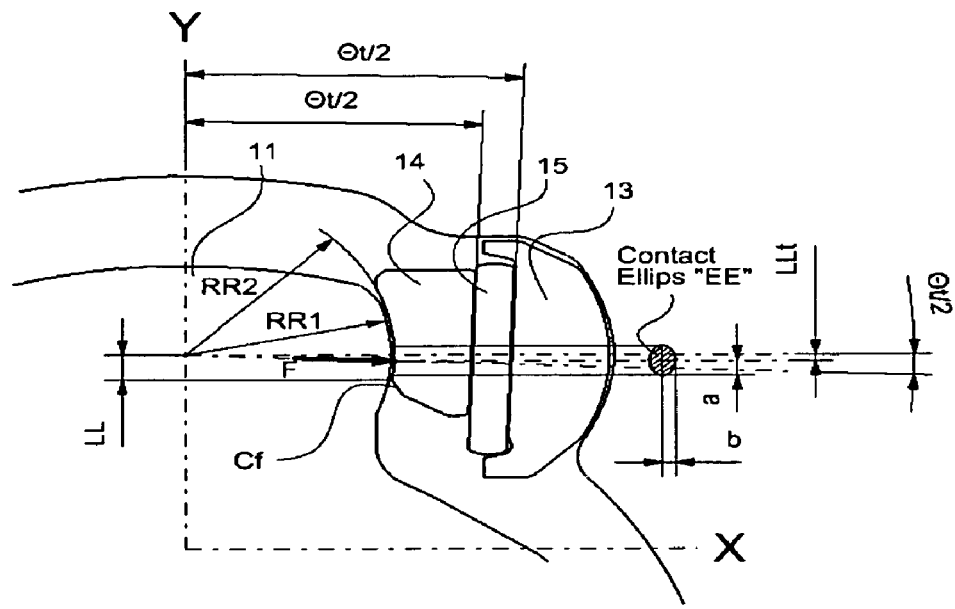
FIGS. 9(a) and 9(b) are partial cross-sectional views of the tripod type constant velocity joint of the present invention, for further illustrating its operation and selection of an appropriate size LL of the inner roller in consideration of its mechanical strength and assembling characteristics of the assembly.
Figure 9B:
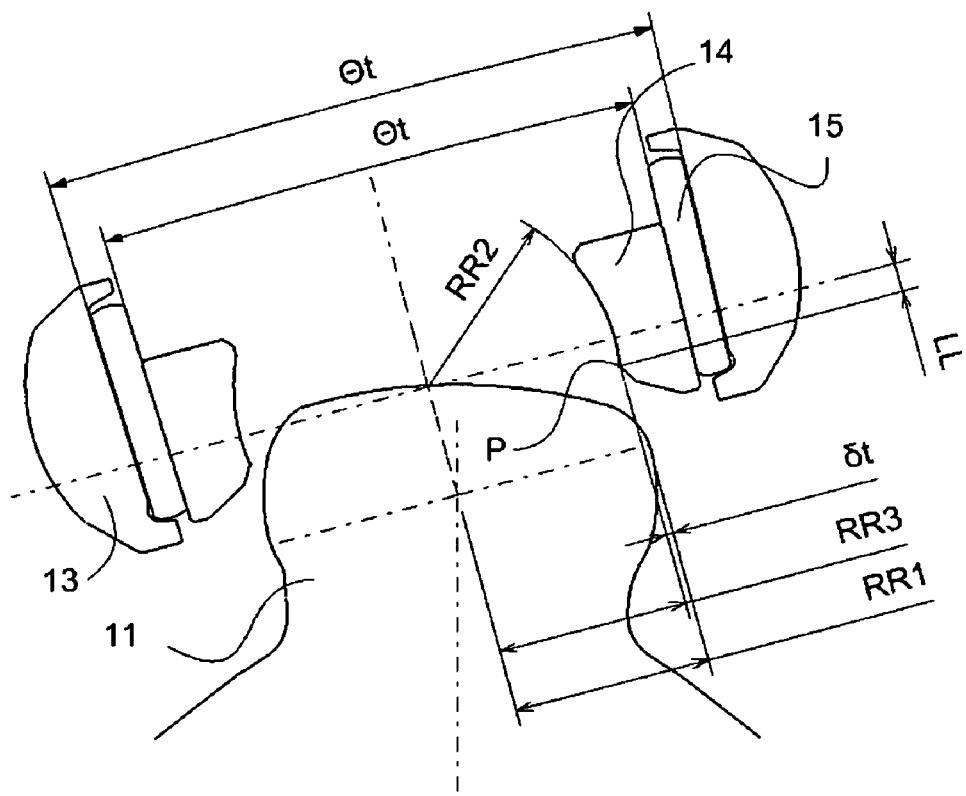
Figure 10:
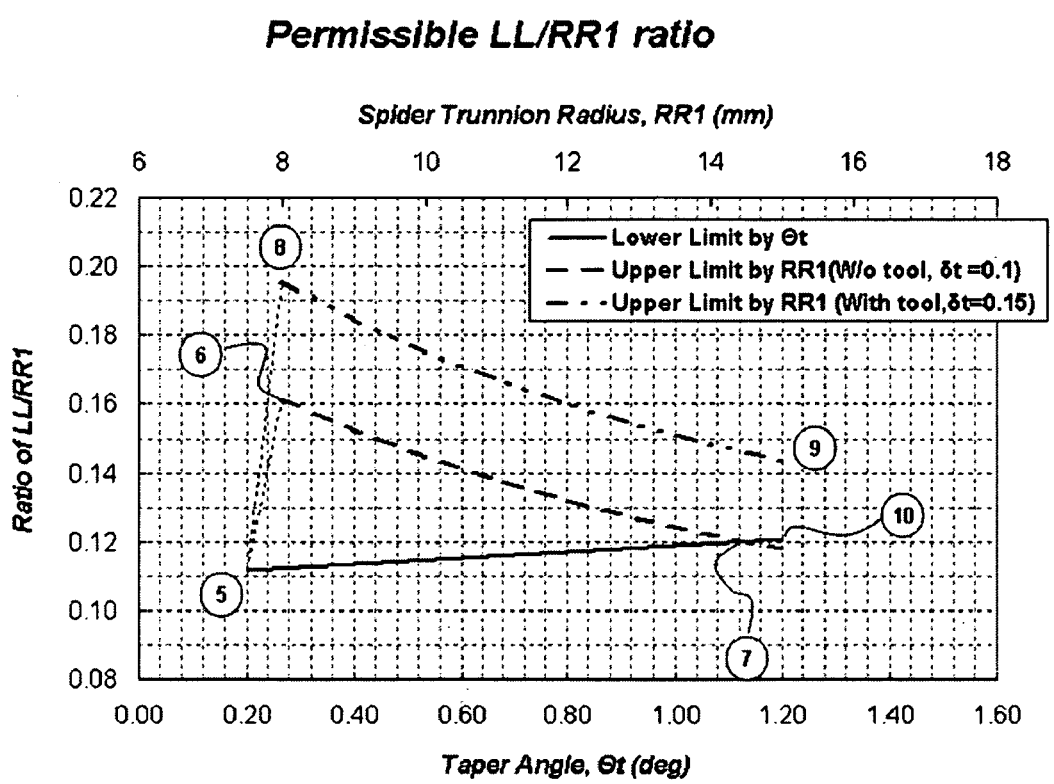
FIG. 10 is a graphic chart illustrating a permissible range of the inner roller size (in particular, the LL/RR1 ratio) applicable for the tapered roller structure of the present invention.

With reference to FIGS. 9(a), 9(b) and 10, selection of appropriate size of the inner roller for the tapered tripod joint of the present invention is described with further details. The appropriate size of the inner roller is particularly defined in terms of the distance LL which refers to the length from the center C3 of spider trunnion to the contacting edge "P" at the start point of chamfer Cf of the inner roller 14. The dimension LL has considerable effects not only on the mechanical strength or durability but also on the assembling and disassembling characteristics of the joint. According to one preferred embodiment of the present invention, a ratio of LL/RR1 is used to define the appropriate distance LL per spider trunnion radius RR1, in which spider trunnion radius RR1 has the range of about 8 mm to about 15 mm for typical constant velocity joints.

In order to calculate the appropriate dimension of the inner roller, the ratio of LL/RR1 particularly in relation with the durability is considered first, while contemplating the effect of the tapered roller structure of the invention. As discussed above, the center of the contact ellipse EE is offset downward by LLt due to the presence of taper angle θt. Under the Hertzian contact theory, the major radius "a" is determined by the curvatures of the trunnion radius RR1 of spider trunnion 11 and inner radius RR2 (Generally, RR1+0.005) of inner roller 14, and the material properties of these parts, and the calculated "a" is about 0.88 mm to about 1.65 mm for typical constant velocity joints. On the other hand, the center offset LLt of the ellipse contact area EE occurring due to the taper angle θt, is represented as LLt=RR2 sin(θt/2)=(RR1+0.005) sin(θt/2). Thus, LLt is about 0.01 mm to about 0.15 mm when the taper angle θt (about 0.23 degree to about 1.17 degree) as calculated above in connection with FIGS. 7-8 and the typical spider trunnion radius RR1 (about 8 mm to about 15 mm) are applied to the equation. Finally, by the sum of the "a" and LLt, the total LL is defined as LL=a+(RR1+0.005)sin(θt/2), and accordingly, the range of LL is about 0.89 mm to about 1.80 mm, and the range of LL/RR1 is about 0.11 to about 0.12.

Next, referring to FIG. 9(b), the ratio of LL/RR1 as related to the assembly and disassembly characteristics of the rollers is obtained, particularly in consideration with the overlap (or margin) δt, which is the difference between the trunnion radius RR1 of spider trunnion 11 and the (projected) radius RR3 at the chamfer edge "P" of the inner roller 14. As shown in the figure, δt can be defined as δt=RR1−RR3=RR1−(RR2$^2$−LL$^2$)$^{1/2}$=)RR1−{(RR1+0.005)$^2$−LL$^2$}$^{1/2}$. Now, considering that the overlap δt is about 0.1 mm for the typical straight rollers of the joints, the dimension LL can be defined as LL=(0.21RR1−0.009975)$^{1/2}$. According to this equation, the range of LL is about 1.29 mm to about 1.77 mm and the range of LL/RR1 is about 0.11 to about 0.16 for the range of the typical spider trunnion radius of about 8 mm to about 15 mm.

Accordingly, taking the above two considerations together, the tapered structure of the invention should have a permissible range LL/RR1 to be in the range from {a+(RR1+0.005)sin(θt/2)}/RR1 to {(0.21 RR1−0.009975)$^{1/2}$}/RR1 when the permissible overlap or margin δt is about 0.1 mm, in order to meet both the durability consideration and the assembling consideration discussed above. Referring to FIG. 10, the graph illustrates the range of permissible LL/RR1 ratio (the inside range of ⑤-⑥-⑦ in the graph) per the taper angle θt (about 0.23 degree to about 1.17 degree) as calculated above in connection with FIGS. 7-8 and the typical spider trunnion radius RR1 (about 8 mm to about 15 mm). However, as shown in the graph of FIG. 10, the range of permissible LL/RR1 ratio is very small when the taper angle θt and the spider trunnion radius RR1 are large. Accordingly, in this case, a disassembly tool is typically required to solve the limitation. With the application of the disassembly tool which can disassemble the roller with up to about 0.15 mm of overlap δt, the permissible LL/RR1 ratio becomes from {a+(RR1+0.005)sin(θt/2)}/RR1 to {(0.31 RR1−0.022475)$^{1/2}$}/RR1 and the calculated LL/RR1 is about 0.11 to about 0.20 (the range of ⑤-⑧-⑨-⑩ in the graph) with the range of taper angle θt and spider trunnion radius.

Figure 11A:
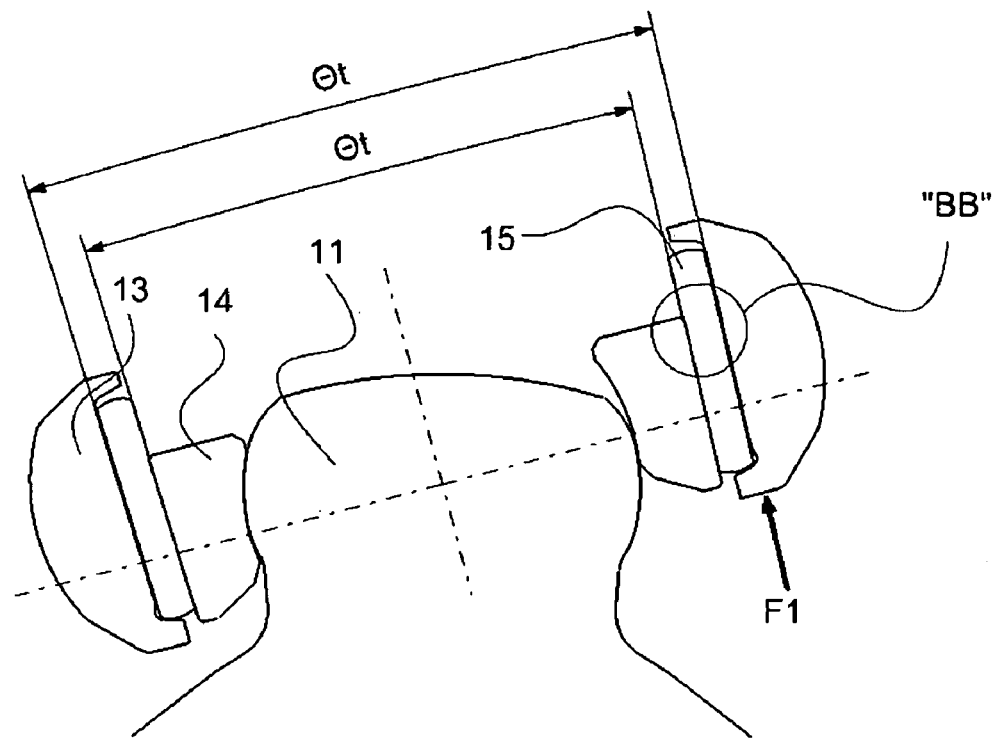
FIGS. 11(a) and 11(b) are partial cross-sectional views of the tripod type constant velocity joint of the present invention, illustrating the assembling process thereof.
Figure 11B:
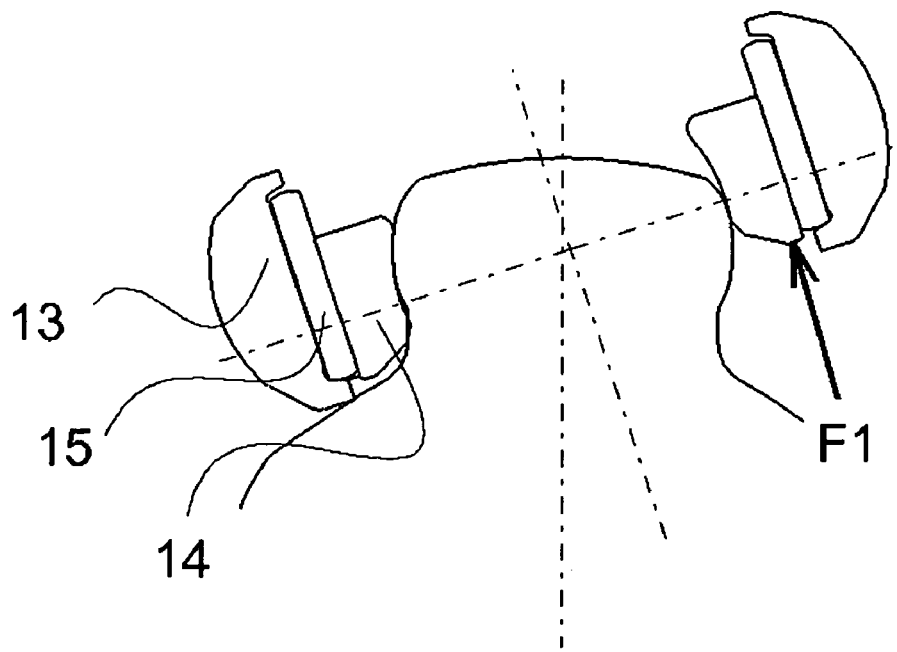

With reference to FIGS. 9(b), 11(a) and 11(b), a preferable method of assembling and disassembling the tripod joint is described herein.

As shown in FIG. 9(b), for assembling the tripod joint the roller assembly (13, 14, and 15) is tilted to a suitable degree and one lower side (e.g., left side as shown) of the inner roller 14 is placed onto the spherical surface of the spider trunnion 11 and the opposite lower side (e.g., right side) of the inner roller 14 is pushed and introduced by hand or with the aid of an assembling tool through the top side of the spherical surface of the spider trunnion 11. Here, the inner roller 14 can be assembled onto the spider trunnion 11 without undue difficulties because the assembly is specifically designed with the assembling and disassembling characteristics in consideration as discussed above, for example, such that the overlap δt is selected to be about 0.1 mm to about 0.15 mm and the LL/RR1 ratio is selected to be about 0.11 to about 0.16 (without tool) or about 0.20 (with tool).

Referring now to FIGS. 11(a) and 11(b), a disassembling process of the joint of the present invention is described. As shown in FIG. 11(a), if load F1 is applied onto a lower side of the outer roller 13 for disassembly, the load F1 is transmitted to the inner roller 14 via needle rollers 15. As a result, the rollers can be easily jammed at the portion "BB" and the needle rollers 15 or other counter portions of the rollers can be damaged or fractured when an excessive force applied to disassemble the roller assembly from the spider trunnion 11. Therefore, as shown in FIG. 11(b), in order to prevent any damage to the roller assembly in the disassembling process, load F1 is applied onto a lower side of the inner roller 14 without applying a substantial force onto the needle rollers 15 or outer roller 13. For this, a disassembling tool may be needed, in particular, when the LL/RR1 ratio is designed to be about 0.16 to about 0.20 and the overlap δt to be about 0.1 mm to about 0.15 mm as discussed above. The disassembling tool is preferably configured to apply a load onto a lower side of the inner roller 14 while applying a counter load onto a top surface of the spider trunnion 11.

As described above in connection with several exemplary embodiments thereof, the tripod type constant velocity joint of the present invention specifically adopts a tapered structure of a same taper angle on the outer surface of the inner roller and on the inner surface of the outer roller. The taper angle (θt) is selected preferably in consideration of both (1) accommodating the inner roller to move without jamming in an entire effective movement range under presence of a maximum joint angle of the drive system, and (2) preventing self separation of the roller assembly by jamming stop between the inner, outer and needle rollers due to the tapered structure of the rollers. Accordingly, the taper angle (θt) is selected to be in a range defined by the equation of $2\tan^{-1}(0.030/Lt) < \theta t < 2\tan^{-1}(0.3556/P1)$, where Lt is a length from an upper end surface of the inner roller to a lower end of the needle rollers, and P1 is a pitch circle diameter of the spider trunnion. For applying to typical vehicles, the taper angle (θt) is preferably in a range in a range from about 0.23° and to about 1.17°.

Moreover, the inner roller is configured to have both (1) a sufficient strength and durability, and (2) a good performance in assembling and disassembling process. For the durability consideration, the dimension LL (i.e., a distance from the center of the spider trunnion to a starting edge of the chamfer or recessed area of the inner roller at initial or neutral position thereof) of the inner roller is selected to cover the entire elliptical contact area which is displaced or offset downward due to presence of the taper angle (θt). For the durability and assembling/disassembling considerations, the ratio LL/RR1 is selected to be in a range from $\{a+(RR1+0.005)\sin(\theta t/2)\}/RR1$ to $\{(0.31\,RR1-0.022475)^{1/2}\}/RR1$. For applying to typical vehicles, the ratio LL/RR1 is preferably in a range from about 0.11 to about 0.20.

The above disclosed embodiments of the invention are representatives of a presently preferred form of the invention, but are intended to be illustrative rather than definitive thereof. Accordingly, those skilled in the art will appreciate or recognize that various modifications and substitutions can be made thereto without departing from the spirit and scope of the present invention as set forth in the appended claims.

What is claimed is:

1. A constant velocity joint for a drive system having a first rotating shaft and a second rotating shaft coupled with the constant velocity joint, the constant velocity joint comprising:
    a hollow housing having an opening at one end, and a closing at its opposite end fixed to an end of the first rotating shaft, an inner face of the housing including a plurality of guide grooves extending in an axial direction of the housing;
    a spider trunnion received in the opening of the hollow housing for transmitting torque between the first and second rotating shafts of the drive system, the spider trunnion including a spherical outer surface; and
    a roller assembly operatively attached on the spider trunnion, the roller assembly including an inner roller having a spherical inner surface for contacting with the spherical outer surface of the spider trunnion, an outer roller having a spherical outer surface for contacting and rolling in a corresponding one of the guide grooves of the hollow housing, and a plurality of needle rollers engaged between the inner and outer rollers;
    wherein the inner roller includes a tapered outer surface with a taper angle (θt), and the outer roller includes a tapered inner surface with the same taper angle (θt);
    wherein the taper angle (θt) is in a range defined by the equation of:

$$2\tan^{-1}(0.030/Lt) < \theta t < 2\tan^{-1}(0.3556/P1);$$

in which Lt is a length from an upper end surface of the inner roller to a lower end of the needle rollers, and P1 is a pitch circle diameter of the spider trunnion.

2. The constant velocity joint of claim 1, wherein the taper angle (θt) is from about 0.23° and to about 1.17°.

3. The constant velocity joint of claim 1, wherein the taper angle (θt) is determined in consideration of both accommodating the inner roller to move without jamming in an entire effective movement range under presence of a maximum joint angle of the drive system, and preventing self separation of the roller assembly by jamming stop between the inner, outer and needle rollers due to the tapered structure of the rollers.

4. The constant velocity joint of claim 1,
    wherein the spherical outer surface of the spider trunnion has a radius (RR1), and the inner roller includes a concave inner contact surface with a radius (RR2);
    wherein the inner roller further has a chamfer or recessed area starting from a lower edge of the concave inner contact surface;
    wherein the inner roller has a dimension LL from the center of the spider trunnion to the starting edge of the chamfer or recessed area, and the inner roller is configured to have a ratio LL/RR1 in a range from $\{a+(RR1+0.005)\sin(\theta t/2)\}/RR1$ to $(0.21RR1-0.009975)^{1/2}/RR1$, in which "a" is a major radius in an elliptical contact area between the spider trunnion and inner roller.

5. The constant velocity joint of claim 4, wherein the ratio LL/RR1 is in a range from about 0.11 to about 0.16.

6. The constant velocity joint of claim 1,
    wherein the spherical outer surface of the spider trunnion has a radius (RR1), and the inner roller includes a concave inner contact surface with a radius (RR2);
    wherein the inner roller further has a chamfer or recessed area starting from a lower edge of the concave inner contact surface;
    wherein the inner roller has a dimension LL from the center of the spider trunnion to the starting edge of the chamfer or recessed area, and the inner roller is configured to have a ratio LL/RR1 in a range from $\{a+(RR1+0.005)\sin(\theta t/2)\}/RR1$ to $(0.31RR1-0.022475)^{1/2}/RR1$, in which "a" is a major radius in an elliptical contact area between the spider trunnion and inner roller.

7. The constant velocity joint of claim 6, wherein the ratio LL/RR1 is in a range from about 0.11 to about 0.20.

8. A constant velocity joint for a drive system having a first rotating shaft and a second rotating shaft coupled with the constant velocity joint, the constant velocity joint comprising:
    a hollow housing having an opening at one end, and a closing at its opposite end fixed to an end of the first rotating shaft, an inner face of the housing including a plurality of guide grooves extending in an axial direction of the housing;
    a spider trunnion received in the opening of the hollow housing for transmitting torque between the first and second rotating shafts of the drive system, the spider trunnion including a spherical outer surface; and a roller assembly operatively attached on the spider trunnion, the roller assembly including an inner roller having a spherical inner surface for contacting with the spherical outer surface of the spider trunnion, an outer roller having a spherical outer surface for contacting and rolling in a corresponding one of the guide grooves of the hollow housing, and a plurality of needle rollers engaged between the inner and outer rollers;

wherein the inner roller includes a tapered outer surface with a taper angle (θt), and the outer roller includes a tapered inner surface with the same taper angle (et);

wherein the taper angle (et) is in a range from about 0.23° and to about 1.17°.

9. The constant velocity joint of claim 8, wherein the spherical outer surface of the spider trunnion has a radius (RR1), and the inner roller includes a concave inner contact surface with a radius (RR2);

wherein the inner roller further has a chamfer or recessed area starting from a lower edge of the concave inner contact surface;

wherein the inner roller has a dimension LL from the center of the spider trunnion to the starting edge of the chamfer or recessed area, and the inner roller is configured to have a ratio LL/RR1 in a range from about 0.11 to about 0.20.

10. The constant velocity joint of claim 9, wherein the ratio LL/RR1 is selected in consideration of a mechanical strength and durability of the inner roller in a manner by selecting the dimension LL to cover an elliptical contact area displaced downward due to the taper angle (θt), and also in consideration of an assembling and disassembling performance of the inner roller to the spider trunnion.

* * * * *